US010225275B1

(12) United States Patent
Xu et al.

(10) Patent No.: US 10,225,275 B1
(45) Date of Patent: Mar. 5, 2019

(54) METHOD FOR COMPUTATIONALLY DETECTING ANOMALIES OF DIGITAL DEVICE BEHAVIOR ON A COMMUNICATIONS NETWORK

(71) Applicant: Syniverse Technologies, LLC, Tampa, FL (US)

(72) Inventors: Huiyue Xu, Beijing (CN); Vladislav Papayan, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/023,445

(22) Filed: Jun. 29, 2018

Related U.S. Application Data

(60) Provisional application No. 62/526,437, filed on Jun. 29, 2017.

(51) Int. Cl.
| H04L 29/06 | (2006.01) |
| G06F 21/31 | (2013.01) |
| G06F 21/55 | (2013.01) |
| H04L 12/26 | (2006.01) |
| H04L 29/12 | (2006.01) |

(52) U.S. Cl.
CPC ........ *H04L 63/1425* (2013.01); *G06F 21/316* (2013.01); *G06F 21/552* (2013.01); *G06F 21/554* (2013.01); *H04L 43/062* (2013.01); *H04L 43/067* (2013.01); *H04L 43/0876* (2013.01); *H04L 63/30* (2013.01); *H04L 61/2015* (2013.01)

(58) Field of Classification Search
CPC ...................................................... H04L 63/30
See application file for complete search history.

(56) References Cited

U.S. PATENT DOCUMENTS

| 9,672,503 | B2* | 6/2017 | Furr | G06Q 20/145 |
| 2014/0074614 | A1* | 3/2014 | Mehanian | G06Q 30/0267 |
| | | | | 705/14.64 |
| 2015/0212869 | A1* | 7/2015 | Chen | G06F 11/0706 |
| | | | | 714/38.1 |
| 2015/0213631 | A1* | 7/2015 | Vander Broek | G06T 11/206 |
| | | | | 345/589 |
| 2015/0324582 | A1* | 11/2015 | Vasseur | G06F 21/554 |
| | | | | 726/23 |
| 2015/0339477 | A1* | 11/2015 | Abrams | G06F 21/554 |
| | | | | 726/23 |

(Continued)

*Primary Examiner* — Ali Shayanfar
(74) *Attorney, Agent, or Firm* — Andriy Lytvyn; Smith & Hopen, P.A.

(57) ABSTRACT

The invention is a method of detecting malicious behavior of a network participant. Specific usage values observable at a network connectivity layer are defined. These usage values can be size of data transferred, quantity of data bursts, a quantity of IP address destinations, a network protocol being used, and/or a length of an encryption key. The invention measures the usage values for the network participant across multiple networks over a predetermined period of time and creates a statistical digital dossier representative of patterns of the measured usage values for the network participant. The invention monitors the behavior of the network participant by measuring current usage values. The current usage values are compared against the statistical digital dossier and, if a deviation beyond a predefined tolerance is detected, an alert signal is issued.

20 Claims, 4 Drawing Sheets

(56) References Cited

U.S. PATENT DOCUMENTS

| | | | |
|---|---|---|---|
| 2016/0028770 A1* | 1/2016 | Raleigh | H04L 63/20 726/1 |
| 2016/0036722 A1* | 2/2016 | Obrecht | G06F 9/50 709/226 |
| 2016/0072834 A1* | 3/2016 | Bott | H04L 63/1425 726/1 |
| 2016/0261465 A1* | 9/2016 | Gupta | H04L 12/2816 |
| 2017/0126718 A1* | 5/2017 | Baradaran | H04L 63/1425 |
| 2017/0201850 A1* | 7/2017 | Raleigh | H04W 4/50 |
| 2017/0302679 A1* | 10/2017 | Caramico | H04L 63/105 |
| 2017/0303180 A1* | 10/2017 | Kapoulas | H04W 36/30 |
| 2017/0310693 A1* | 10/2017 | Howard | H04L 63/1425 |
| 2017/0310703 A1* | 10/2017 | Ackerman | H04L 63/1458 |
| 2017/0324759 A1* | 11/2017 | Puri | G06N 7/005 |
| 2017/0325113 A1* | 11/2017 | Markopoulou | H04W 4/20 |
| 2018/0019931 A1* | 1/2018 | Jalan | H04L 41/0681 |
| 2018/0027004 A1* | 1/2018 | Huang | H04L 63/1425 726/23 |
| 2018/0314965 A1* | 11/2018 | Dodson | G06N 7/005 |

\* cited by examiner

METHOD FOR COMPUTATIONALLY DETECTING ANOMALIES OF DIGITAL DEVICE BEHAVIOR ON A COMMUNICATIONS NETWORK

PRIORITY CLAIM

This non-provisional application claims priority to U.S. Provisional Patent Application No. 62/526,437 filed Jun. 29, 2017, entitled "Method for Computationally Detecting Anomalies of Digital Device Behavior on a Communications Network," which is incorporated herein by reference.

BACKGROUND OF THE INVENTION

1. Field of the Invention

This invention relates to Telecommunications. More specifically, it relates to a method of identifying potentially malicious behavior on a communications network.

2. Brief Description of the Related Art

Malicious behavior of communications network participants can be disruptive to the normal functionality of the network. Both human and machine network participants may become compromised and, as a result, may start exhibiting malicious behavior. While typical human-oriented authentication methods, such as the ones involving passwords, multi-factor passwords, face recognition, and biometric dossiers can ensure that the network participant is a human rather than a bot, these authentication methods do not detect or prevent unwanted behavior.

Additionally, it is possible that a human using/directing a given device is not exhibiting malicious behavior, but the device's application is infected with malicious software. Again, a human-oriented authentication/attestation will not prevent the unwanted behavior because the human will successfully pass the authentication challenge. Finally, it is possible that malicious behavior can only be attributed to a 'group' of participating devices/applications—while an individual device application is not violating an expectation. Again, in this case, human-oriented authentication will not stop or alert about the unwanted behavior.

Thus, what is needed is a method of establishing a model of a network participant's network usage and automatically comparing user's real-time usage values against the model to detect anomalies in network participant's behavior, which triggers an alert signal being automatically transmitted to a network administrator.

SUMMARY OF THE INVENTION

In an embodiment, the invention is a method of detecting malicious behavior of a network participant. A set of usage values observable at a network size of data transferred, quantity of data bursts, quantity of IP address destinations, a type of network protocol being used, and a length of an encryption key. A Data Processing Module measures the usage values for the network participant across a plurality of networks over a predetermined period of time. Based on the measured usage values, the Data Processing Module creates a statistical digital dossier representative of patterns of the parameters associated with the network participant's use of the network.

A Traffic Capturing Module captures data traffic exchanged between the network participant and the severs. The data traffic can be captured using a mirroring or reporting function of an existing network device, or via adding a network capturing device into the plurality of networks.

The Traffic Capturing Module makes the captured data traffic available to the Data Processing Module. The Data Processing Module identifying the participant's current data traffic by correlating the data traffic with the control signaling, authentication signaling, or IP address allocated by Dynamic Host Configuration Protocol (DHCP). After the network participant's data traffic is obtained, the Data Processing Module measures current usage values of the network participant's data traffic in substantially real team. Next, the Data Processing Module compares the current usage values against the usage values within the statistical digital dossier of the network participant. If the current usage values deviate from the usage values within the statistical digital dossier beyond a predefined tolerance, an alert signal is issued to the network administrator.

In an embodiment, time series similarity measures are used to compare the current usage values against the statistical digital dossier uses. Some examples of the time series similarity measures are Pearson's correlation, Goodman and Kruskal's gamma, and distance correlation. A data-frame arrival time may be used as a foundational time for the time series.

The network participant may be a device, a device and application, or a group of devices and applications under a common group identifier. The network participant may be identified by the device Media Access Control (MAC) address, subscriber identifier, user name, International Mobile Subscriber Identity (IMSI), or Mobile Station International Subscriber Directory Number (MSISDN). The networks on which network participant's usage values may be observed include wired and wireless networks, such as Code Division Multiple Access (CDMA), General Packet Radio Service (GPRS), Universal Mobile Telecommunications System (UMTS), Long-Term Evolution (LTE), 5G, Low Power Wide Area Networks (LPWAN), Wi-Fi, Broadband Internet, Asymmetric digital subscriber line (ADSL), and a combination thereof.

In an embodiment, a cipher suite is used to measure the length of the encryption key.

In an embodiment, the system has a self-updating capability: if the current usage values are within the predefined tolerance, the network participant's statistical digital dossier is updated based on the current usage values. The statistical digital dossier may be created using data available in every frame of data transmitted to and from the network participant.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
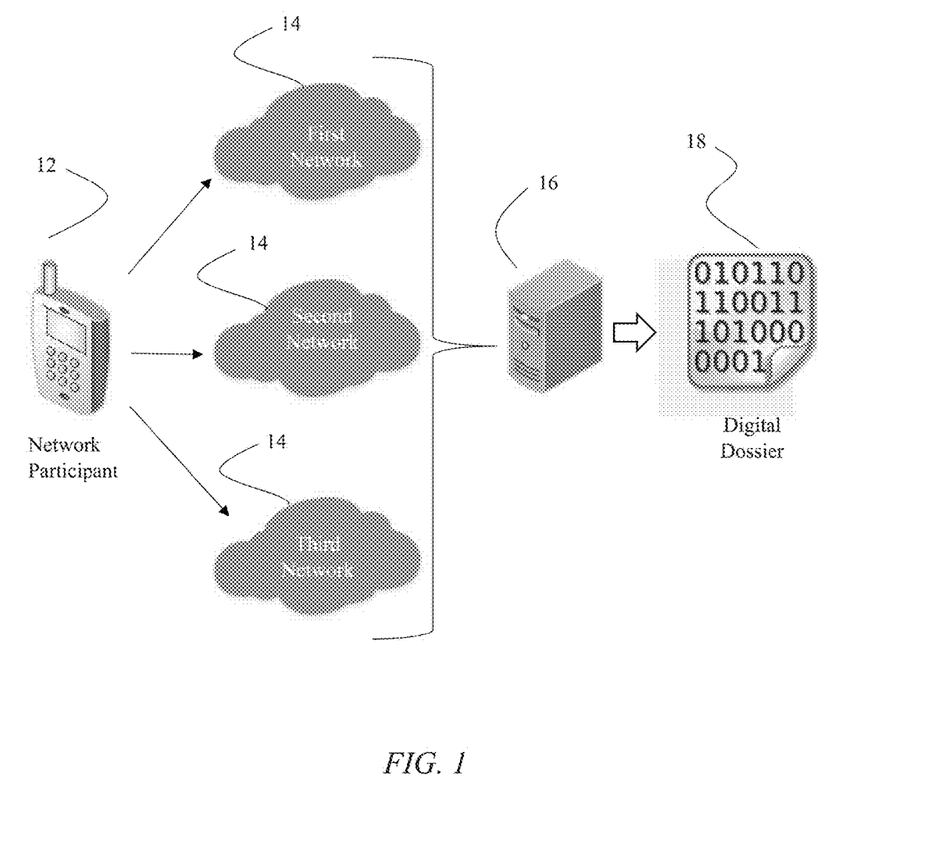
FIG. 1 is a diagram schematically depicting an embodiment of architecture of the present invention.

The invention enables detection of malicious and/or unwanted behavior of human and machine network participants after they pass initial authentication. FIG. 1 depicts a network participant 12 that connects across a plurality of networks 14. The invention provides a methodology to monitor behavior of network participant 12 on multiple networks 14. A Data Processing Module 16 processes data traffic of network participant 12 and creates a statistical digital dossier 18 of network participant 12. The statistical digital dossier 18 is defined and established by behavior exhibited by network participant 12. Network participant 12 can be a device, an application, a device and application, or a plurality of devices and applications under a common unique group identifier.

Figure 2:
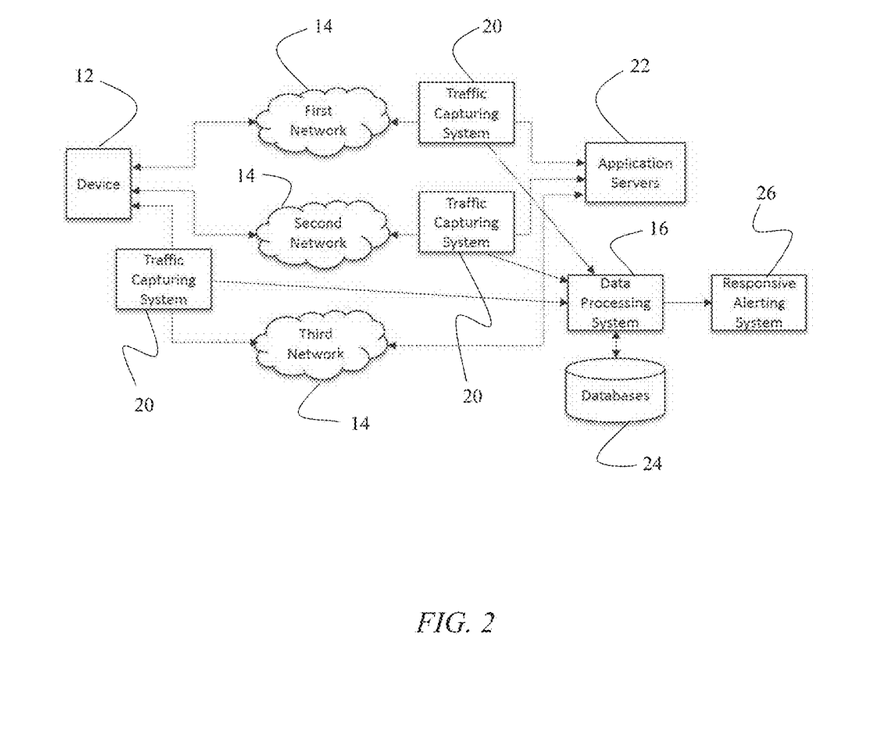
FIG. 2 is an exemplified diagram schematically depicting an embodiment of system components of the present invention.

In the embodiment depicted in FIG. 2, an exemplary block diagram is used to depict the various components the invention. Traffic Capturing Module 20 is deployed into Networks 14 to capture the traffic exchanged between network participant 12 and the application servers 22. Traffic Capturing Module 20 can be deployed between network 12 and application servers 22 and/or between network participant 12 and networks 14. FIG. 2 illustrates both scenarios: for the first and second network, the Traffic Capturing Module 20 is deployed between networks 14 and application servers 22, while for the third network, Traffic Capturing Module 20 is deployed between network participant 12 and network 14. Traffic Capturing Module 20 receives data traffic via mirroring or reporting function of the existing network devices, or via adding network capturing equipment into the networks.

Traffic Capturing Module 20 identifies data traffic of network participant 12 by correlating the data traffic with the control signaling, authentication signaling, or IP address allocated by Dynamic Host Configuration Protocol (DHCP), filters out the traffic related to network participant 12, and calculates the usage values in real time or near-real time manner. The usage values include the size of data transferred, the quantity of data bursts, the number of IP address destinations, the network protocol being used; and the length of an encryption key; then reports the usage values to the Data Processing System.

As shown in FIG. 2, the Data Processing Module 16 interfaces with multiple Traffic Capturing Modules 20 to collect the usage values from multiple networks 14 for the same network participant 12 or different network participants 12 belonging to the same device group. It will be apparent to those skilled in the art that multiple Data Processing Modules 16 may be used to serve the same purpose, in which multiple Data Processing Modules 16 interface with multiple Traffic Capturing Modules 20 while keep the data synchronized via databases 24 or via synchronization protocols communicated among multiple Data Processing Modules 16. The exemplary Traffic Capturing Modules 20 compare the received usage values with statistical digital dossier 18 that are configured or stored in database 24 based on the time series similarity measures selected from the group consisting of Pearson's correlation, Goodman and Kruskal's gamma, and distance correlation, and generates alerting events towards to Responsive Alerting System if the current usage values deviate from statistical digital dossier 18 beyond a predefined tolerance. If network participant's 12 current usage values deviate from its statistical digital dossier 18 by more than a predefined tolerance, then a Responsive Alerting Module 26 issues an alert signal to the system administrator, who can implement remedial measures.

Based on current usage values that are collected from network participant 12 during a predefined period of time, Data Processing Module 16 further updates statistical digital dossier 18 representative of patterns of the measured usage values after a predefined period of time. Thus, the invention enables self-update capabilities of statistical digital dossier 18 without the need for human interaction.

Figure 3:
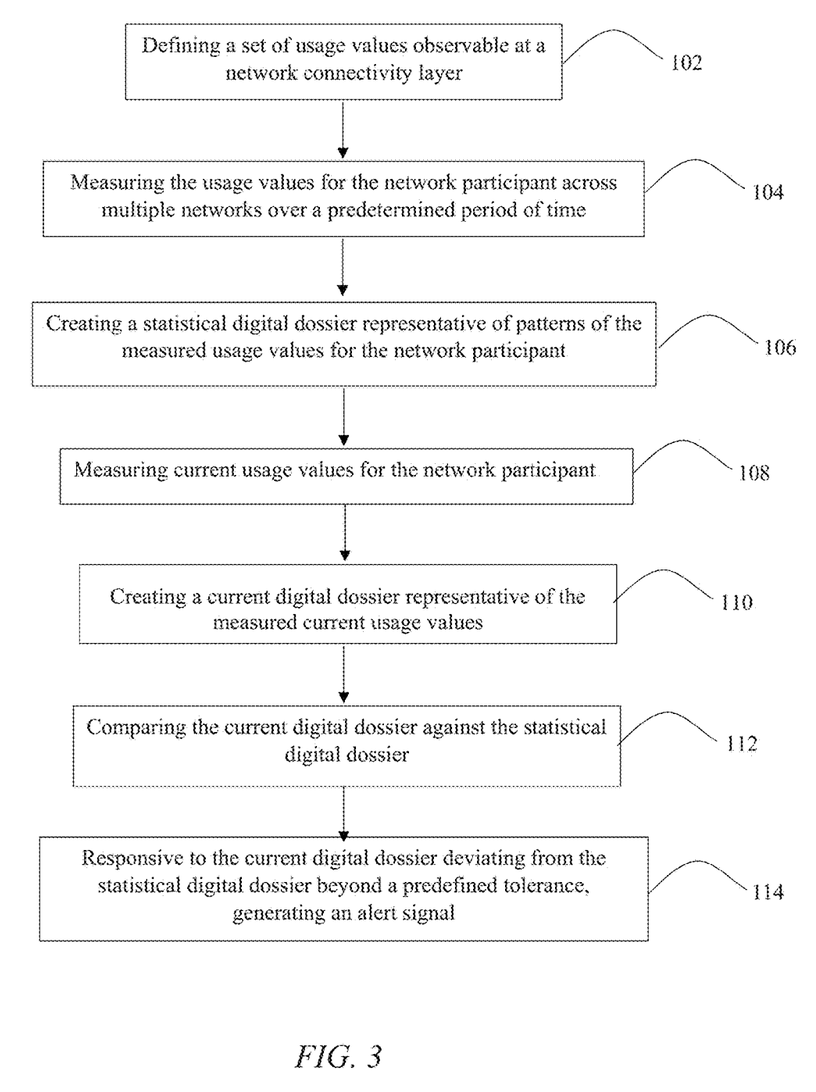
FIG. 3 is a flowchart schematically depicting the steps of the method of identifying malicious behavior of a network participant.

The method of detecting suspect behavior according to the present invention is schematically illustrated in FIG. 3. First, a set of measurable usage values associated with data traffic parameters of network participant 12 on networks 14 is defined. The invention defines specific observable values used to create statistical digital dossier 18 and measure network participant's 16 current usage values. The observable values must be observable from the position of connectivity providers. In other words, to build out the attributes of the time series, the invention leverages the characteristics that can be observed and recorded at the connectivity layer. In an embodiment, the usage values include the size of data transferred, the quantity of data bursts, the number of IP address destinations, the network protocol being used, and the length of an encryption key.

In step 104, Data Processing Module 16 measures the usage values associated with network participant's 12 data traffic captured by Traffic Capturing Modules 20. In step 106, Data Processing Module 16 creates statistical digital dossier 18 of network participant's 12 typical connectivity usage pattern. Statistical digital dossier 18 is created by analyzing usage patterns of a given network participant 12 across at least one, but preferably, multiple operator networks 14. By using data traffic from multiple networks 14, the invention improves precision of statistical digital dossier 18. The invention leverages the fact that a given network participant 12 can often roam on more than one network 14 at different times and may different behaviors on different networks 12. The behavior of network participant 12 observed by connectivity enabler (e.g., network operator) can be digitally encoded using traffic data of network participant 12 across multiple networks 12.

In step 108, Data Processing Module 16 measures network participant's 12 current usage values based on the data traffic captured by Traffic Capturing Module 20. In step 110, a current digital dossier representative of network participant's 12 real-time usage values is created. In step 112, Data Processing Module 16 compares the current usage values against the statistical digital dossier 18. If the current usage values are not in line with network participant's 12 statistical digital dossier 18 beyond a predefined permissible threshold network participant 12 is considered to be "suspect." In step 114, an alert signal is issued. The alert signal communicates to the system administrator the detected anomaly along with corresponding data context for subsequent analysis and resolution workflows.

The following example is used to illustrate an embodiment of the invention. For example, a Smart Car (a car that has multiple Devices that use mobile network)—i.e., network participant 12—would usually roam between different networks 14 depending on the car's geographical location. This means that the Smart Car would use multiple mobile networks 14 over time. The patterns of use exhibited by the Smart Car across the multiple networks 14 leads to creation of a multi-factor behavioral dossier 18 of a given device's usage. The ability to track the behavior of network participant 12 across multiple networks 14 enables creation of a more precise statistical digital dossier 18. Statistical digital dossier 18 represents similarity of a usage pattern across mobile network operators 18.

Once network participant's 12 statistical digital dossier 18 is established, it is possible to perform behavior attestation associated with network participant 12. If the real-time usage values fall outside of statistically-defined parameters of the statistical digital dossier 18, which is used as a reference of network participant's 12 ordinary network behavior, then the invention will detect the abnormality and issue an alert for subsequent analysis/resolution steps.

Statistical digital dossier 18 is built from data available in every frame of transmitted data. Statistical digital dossier 18 can include aggregated values as well as the details from which they were built. For mobile network operators, and IPX network operators (IPX network operator deal with roaming related mobile data, voice, messaging traffic), all the attributes of typical internet traffic are available, in addition to the home operator ID, the device ID, and the roaming (visiting) operator ID.

The invention constructs time series for details and aggregation-level data values that constitute Statistical digital dossier 18 of network participant 12 for networks 14. Data-frame arrival time is used as foundational time for the time series. Data frames contain volume, sequence and other important attributes. For example, to support the attribute of the feature vector $x\_5$ (see below) a Cipher Suite can be used as it provides encryption key length and encryption cipher used, for encrypted traffic.

Figure 4:
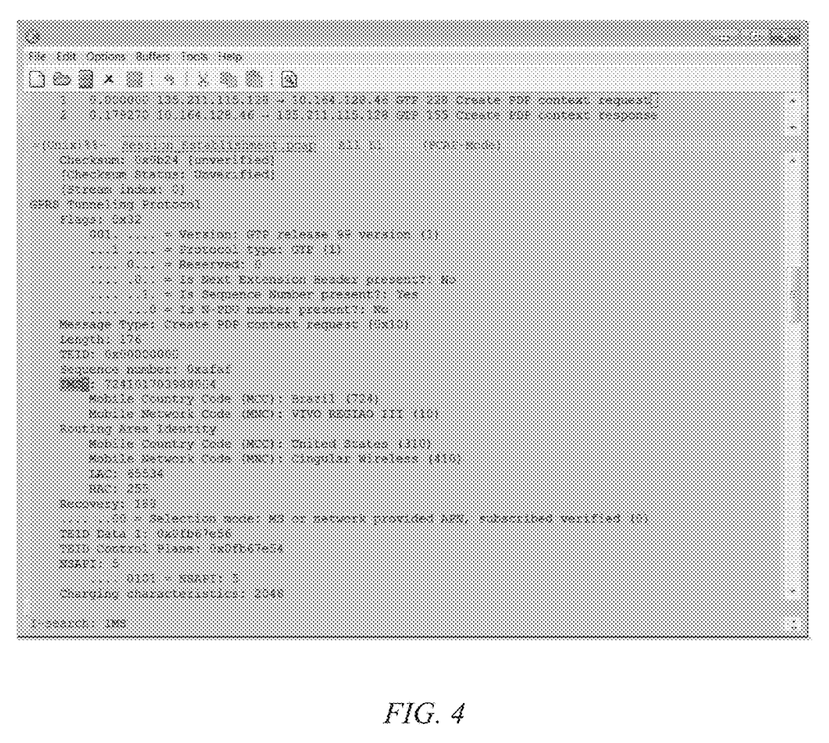
FIG. 4 is a screenshot depicting mobile device identification data frame available in GTP traffic as used by IPX operators showing some examples of network usage values.

In an embodiment, the observation values the invention uses are all of the available fields in the corresponding traffic. Some examples of measurable usage values are depicted in FIG. 4 and are described below:

($x\_1$) Size of data transferred. 24 hours can be split in 1000 segments. The amount of data uploaded and downloaded by a given device per time segment is recorded. The observation is done over a predefined period—e.g., a month. The predefined time period is a particular dimension, which is by itself a time series matrix.

($x\_2$) Data bursts. Same methodology as $x\_1$ above, but only bursts are recorded as observed value, rather than download/upload data size. Where burst is a number of KBs exceeding a preconfigured threshold.

($x\_3$) Number of IP address destinations. Note, normally it is best to categorize the destination IP addresses by source application, but in encrypted traffic pattern the source application is not known and, therefore, the destination IP address is used.

($x\_4$) Network protocol being used within a given session including the following:
 UDP
 TCP
 DTLS
 UDP-QUIC
 GTP-encapsulated (encapsulating protocol of IPX networks)
 GTP-C (control part of IPX protocol)
 SMS
 MMS
 Voice ($x\_5$) Estimated (or declared) length of encryption key. If the key length is smaller than usual, then then the invention can alert that encryption strength might have been reduced, even if all the other dimensions are the same.

Several time-series-similarity measures can be applied to measure real-time usage values with one or more of the observation values listed above that have been previously established across multiple networks 14 that network participant 12 used previously. There are a number of applicable time series similarity measures that can be used. These are called correlation coefficients. One such example is a scaled correlation that is a variant of Pearson's correlation in which the range of the data is restricted intentionally and in a controlled manner to reveal correlations between fast components in time series. Another example is Goodman and Kruskal's gamma. A third example is distance correlation.

Time series model is a good fit to implement the digital dossier of usage. The feature vector is defined, where every dimension is a time series itself. This enables the invention to use various statistics to measure the similarity between previous and current usage dossiers.

After the similarity of the current and previous dossiers is evaluated, the invention can issue an alert to designated users, and request an action. The alerting step can be implement programmatically via API or by other means that allow to request a decision/sentiment of a human operator.

Participant behavior attestation can also be time-based. For example, a first device having a first IP address can communicate with a second device having a second IP address using that digital dossier only during a designated time period.

Time Series Examples

Time interval is measured per network participant, per connectivity session.

Time series Session Level: is defined as consecutive, equally-spaced time intervals, assigned TimeID, and the associated values of aggregated observations.

Time series Cross Session Level: is defined as consecutive, equally spaced time intervals, assigned timeID, and the associated aggregated values of observations within that time period.

Time series Cross Device Level: is defined same as Time Series Cross session level, only instead of organized within a device Id, these are organized within a group of devices (where the group ID is the ID).

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Alert signal—a data packet or an electric signal transmitted to alert a network administrator of an anomaly detected in a network participant's usage of a network.

Current usage values—values of substantially real-time parameters associated with a network participant's usage of a network.

Data traffic—data packets traversing a network at a given point in time.

Network connectivity layer—a network layer responsible for packet forwarding and routing.

Network participant—an application, device, or a combination thereof that transmits or receives data packets via a network.

Server—a computer program or device that provides services to a network participant.

Statistical digital dossier-a model of network participant's ordinary usage of a network based on user's historical use of a network.

Usage values—parameters associated with a network participant's use of a network.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

Appendix A

Example of an HTTS (TLS-encrypted) packet. The encrypted traffic has significantly fewer details than non-encrypted traffic. APPENDICES A-B show observable usage values (emphasized in bold) that are used for creating the digital dossier of the network participant's behavior derived from encrypted traffic.

This is an example of a frame #5 within a packet that establishes a new session or continuous an existing one. A number of technologies can be used to correlate subsequent traffic to the initial traffic because many traffic attributes are declared on initial handshake, and then not repeated during a connection session.

Cipher Suit shows the type of cipher and the key length used. This field corresponds to X_5 attribute of the DUFP-V vector.

Example of an HTTS (TLS-encrypted) packet:
Frame 5: 223 bytes on wire (1784 bits), 223 bytes captured (1784 bits)
  Encapsulation type: Ethernet (1)
  Arrival Time: May 1, 2017 13:40:11.873711000 Eastern Daylight Time
  [Time shift for this packet: 0.000000000 seconds]
  Epoch Time: 1493660411.873711000 seconds
  [Time delta from previous captured frame: 0.168454000 seconds]
  [Time delta from previous displayed frame: 0.000000000 seconds]
  [Time since reference or first frame: 0.336313000 seconds]
  Frame Number: 5
  Frame Length: 223 bytes (1784 bits)
  Capture Length: 223 bytes (1784 bits)
  [Frame is marked: False]
  [Frame is ignored: False]
  [Protocols in frame: eth:ethertype:ip:tcp:ssl]
Ethernet II, Src: Avm_42:4e:b4 (08:96:d7:42:4e:b4), Dst: IntelCor_7f:a7:15 (80:00:0b:7f:a7:15)
  Destination: IntelCor_7f:a7:15 (80:00:0b:7f:a7:15)
    Address: IntelCor_7f:a7:15 (80:00:0b:7f:a7:15)
    .... ..0. .... .... ....=LG bit: Globally unique address (factory default)
    .... ...0 .... .... ....=IG bit: Individual address (unicast)
  Source: Avm_42:4e:b4 (08:96:d7:42:4e:b4)
    Address: Avm_42:4e:b4 (08:96:d7:42:4e:b4)
    .... ..0. .... .... ....=LG bit: Globally unique address (factory default)

.... ...0 .... .... .... ....=IG bit: Individual address
(unicast)
Type: IPv4 (0x0800)
Internet Protocol Version 4, Src: 104.239.158.116, Dst:
192.168.178.34
0100 ....=Version: 4
.... 0101=Header Length: 20 bytes (5)
Differentiated Services Field: 0x00 (DSCP: CSO,
ECN: Not-ECT)
0000 00..=Differentiated Services Codepoint:
Default (0)
.... ..00=Explicit Congestion Notification: Not ECN-
Capable Transport (0)
Total Length: 209
Identification: 0x7732 (30514)
Flags: 0x02 (Don't Fragment)
0... ....=Reserved bit: Not set
.1.. ....=Don't fragment: Set
..0. ....=More fragments: Not set
Fragment offset: 0
Time to live: 115
Protocol: TCP (6)
Header checksum: 0x15c6 [validation disabled]
[Header checksum status: Unverified]
Source: 104.239.158.116
Destination: 192.168.178.34
[Source GeoIP: Unknown]
[Destination GeoIP: Unknown]
Transmission Control Protocol, Src Port: 443, Dst Port:
52378, Seq: 1, Ack: 227,
Len: 169
Source Port: 443
Destination Port: 52378
[Stream index: 0]
[TCP Segment Len: 169]
Sequence number: 1 (relative sequence number)
[Next sequence number: 170 (relative sequence number)]
Acknowledgment number: 227 (relative ack number)
Header Length: 20 bytes
Flags: 0x018 (PSH, ACK)
000. .... ....=Reserved: Not set
...0 .... ....=Nonce: Not set
.... 0... ....=Congestion Window Reduced (CWR):
Not set
.... .0.. ....=ECN-Echo: Not set
.... ..0. ....=Urgent: Not set
.... ...1 ....=Acknowledgment: Set
.... .... 1...=Push: Set
.... .... .0..=Reset: Not set
.... .... ..0.=Syn: Not set
.... .... ...0=Fin: Not set
[TCP Flags: Â•Â•Â•Â•Â•Â•Â•APÂ•Â•Â•]
Window size value: 260
[Calculated window size: 66560]
[Window size scaling factor: 256]
Checksum: 0xad83 [unverified]
[Checksum Status: Unverified]
Urgent pointer: 0
[SEQ/ACK analysis]
[This is an ACK to the segment in frame: 4]
[The RTT to ACK the segment was: 0.168454000 seconds]
[iRTT: 0.167646000 seconds]
[Bytes in flight: 169]
[Bytes sent since last PSH flag: 169]

Secure Sockets Layer
TLSv1.2 Record Layer: Handshake Protocol: Server Hello
Content Type: Handshake (22)
Version: TLS 1.2 (0x0303)
Length: 89
Handshake Protocol: Server Hello
Handshake Type: Server Hello (2)
Length: 85
Version: TLS 1.2 (0x0303)
Random
GMT Unix Time: May 1, 2017 13:40: 10.000000000 Eastern Daylight Time
Random Bytes: 17f2ed9fc443 a0586d3696cd0db2ae39ef28cec73 d6fdb75 ....
Session ID Length: 32
Session ID: c11e0000379270e6d3e2455685269f 315d9772faf9bdfd82 ....
Cipher Suite: TLS_ECDHE_RSA_WITH_AES_ 256_CBC_SHA (0xc014)
Compression Method: null (0)
Extensions Length: 13
Extension: Extended Master Secret
Type: Extended Master Secret (0x0017)
Length: 0
Extension: renegotiation_info
Type: renegotiation_info (0xff01)
Length: 1
Renegotiation Info extension
Renegotiation info extension length: 0
Extension: server name
Type: server_name (0x0000)
Length: 0
TLSv1.2 Record Layer: Change Cipher Spec Protocol: Change Cipher Spec
Content Type: Change Cipher Spec (20)
Version: TLS 1.2 (0x0303)
Length: 1
Change Cipher Spec Message
[Expert Info (Note/Sequence): This session reuses previously negotiated keys (Session resumption)]
[This session reuses previously negotiated keys (Session resumption)]
[Severity level: Note]
[Group: Sequence]
TLSv1.2 Record Layer: Handshake Protocol: Encrypted Handshake Message
Content Type: Handshake (22)
Version: TLS 1.2 (0x0303)
Length: 64
Handshake Protocol: Encrypted Handshake Message Appendix B Example of a frame in which data is encrypted using QUIC protocol:
Frame 3: 84 bytes on wire (672 bits), 84 bytes captured (672 bits)
Encapsulation type: Ethernet (1)
Arrival Time: May 1, 2017 14:34:12.925590000 Eastern Daylight Time
[Time shift for this packet: 0.000000000 seconds]
Epoch Time: 1493663652.925590000 seconds
[Time delta from previous captured frame: 0.001057000 seconds]

[Time delta from previous displayed frame: 0.000000000 seconds]
[Time since reference or first frame: 0.001359000 seconds]
Frame Number: 3
Frame Length: 84 bytes (672 bits)
Capture Length: 84 bytes (672 bits)
[Frame is marked: False]
[Frame is ignored: False]
[Protocols in frame: eth:ethertype:ip:udp:quic]
Ethernet II, Src: IntelCor_7f:a7:15 (80:00:0b:7f:a7:15), Dst: Avm_42:4e:b4 (08:96:d7:42:4e:b4)
    Destination: Avm_42:4e:b4 (08:96:d7:42:4e:b4)
        Address: Avm_42:4e:b4 (08:96:d7:42:4e:b4)
        .... ..0. .... .... .... ....=LG bit: Globally unique address (factory default)
        .... ...0 .... .... .... ....=IG bit: Individual address (unicast)
    Source: IntelCor_7f:a7:15 (80:00:0b:7f:a7:15)
        Address: IntelCor_7f:a7:15 (80:00:0b:7f:a7:15)
        .... ..0. .... .... .... ....=LG bit: Globally unique address (factory default)
        .... ...0 .... .... .... ....=IG bit: Individual address (unicast)
    Type: IPv4 (0x0800)
Internet Protocol Version 4, Src: 192.168.178.34, Dst: 173.194.79.189
    0100 ....=Version: 4
    .... 0101=Header Length: 20 bytes (5)
    Differentiated Services Field: 0x00 (DSCP: CS0, ECN: Not-ECT)
        0000 00..=Differentiated Services Codepoint: Default (0)
        .... ..00=Explicit Congestion Notification: Not ECN-Capable Transport (0)
    Total Length: 70
    Identification: 0x0c21 (3105)
    Flags: 0x02 (Don't Fragment)
        0... ....=Reserved bit: Not set
        .1.. ....=Don't fragment: Set
        ..0. ....=More fragments: Not set
    Fragment offset: 0
    Time to live: 128
    Protocol: UDP (17)
    Header checksum: 0x7e3b [validation disabled]
    [Header checksum status: Unverified]
    Source: 192.168.178.34
    Destination: 173.194.79.189
    [Source GeoIP: Unknown]
    [Destination GeoIP: Unknown]
User Datagram Protocol, Src Port: 63694, Dst Port: 443
    Source Port: 63694
    Destination Port: 443
    Length: 50
    Checksum: 0x25dd [unverified]
    [Checksum Status: Unverified]
    [Stream index: 0]
QUIC (Quick UDP Internet Connections)
    Public Flags: 0x0c
        .... ...0=Version: No
        .... ..0.=Reset: No
        .... 11..=CID Length: 8 Bytes (0x3)
        ..00 ....=Packet Number Length: 1 Byte (0x0)
        .0.. ....=Multipath: No
        0... ....=Reserved: 0x0
    CID: 9918543470185686935
    Packet Number: 196
    Payload: 97052777434149172f86197891ea19a4 2f4a68647f11a9b9a ....

What is claimed is:

1. A method of detecting an anomaly in a network participant's usage of a network comprising the steps of:

defining a set of usage values observable at a network connectivity layer, the usage values selected from the group consisting of a size of data transferred, a quantity of data bursts, a quantity of IP address destinations, a type of network protocol being used, and a length of an encryption key;

measuring the usage values for the network participant across a plurality of networks over a predetermined period of time;

constructing a time series of the measured usage values to establish a statistical digital dossier representative of patterns of the measured usage values for the network participant across the plurality of networks;

capturing data traffic exchanged between the network participant and a sever;

identifying the participant's current data traffic by correlating the data traffic with the control signaling, authentication signaling, or IP address allocated by Dynamic Host Configuration Protocol (DHCP);

measuring current usage values of the network participant's data traffic in real time, the current usage values selected from the group consisting of the size of data transferred, the quantity of data bursts, the quantity of IP address destinations, the type of network protocol being used, and the length of an encryption key;

comparing the current usage values against the usage values within the statistical digital dossier of the network participant; and responsive to the current usage values deviating from the usage values within the statistical digital dossier beyond a predefined tolerance, issuing an alert signal.

2. The method of claim 1, wherein the step of comparing the current usage values against the statistical digital dossier uses time series similarity measures.

3. The method of claim 2, wherein the time series similarity measures are selected from the group consisting of Pearson's correlation, Goodman and Kruskal's gamma, and distance correlation.

4. The method of claim 2, wherein a data-frame arrival time is used as a foundational time for the time series.

5. The method of claim 1, wherein the network participant is a device, a device and application, or a group of devices and applications under a common group identifier.

6. The method of claim 5, wherein the network participant is identified by the device Media Access Control (MAC) address, subscriber identifier, user name, International Mobile Subscriber Identity (IMSI), or Mobile Station International Subscriber Directory Number (MSISDN).

7. The method of claim 1, wherein the plurality of networks is selected from the group consisting of wired and wireless networks, including Code Division Multiple Access (CDMA), General Packet Radio Service (GPRS), Universal Mobile Telecommunications System (UMTS), Long-Term Evolution (LTE), 5G, Low Power Wide Area Networks (LPWAN), Wi-Fi, Broadband Internet, Asymmetric digital subscriber line (ADSL), and a combination thereof.

8. The method of claim 1, wherein a cipher suite is used to measure the length of the encryption key.

9. The method of claim 1, wherein the statistical digital dossier is created using data available in every frame of data transmitted to and from the network participant.

10. The method of claim 1, wherein the step of capturing the data traffic comprises a mirroring or reporting function of an existing network device, or via adding a network capturing device into the plurality of networks.

11. The method of claim 1, further comprising updating the statistical digital dossier based on the current usage values if the current usage values are within the predefined tolerance.

12. A non-transitory computer-readable medium storing a program including instructions that, when executed by a processor, cause the processor to perform the steps comprising:

receiving a set of predefined usage values observable at a network connectivity layer, the usage values selected from the group consisting of a size of data transferred, a quantity of data bursts, a quantity of IP address destinations, a type of network protocol being used, and a length of an encryption key;

measuring the usage values for the network participant across a plurality of networks over a predetermined period of time;

constructing a time series of the measured usage values to establish a digital dossier representative of patterns of the measured usage values for the network participant across the plurality of networks;

obtaining captured data traffic exchanged between the network participant and a sever;

identifying the participant's current data traffic by correlating the data traffic with the control signaling, authentication signaling, or IP address allocated by Dynamic Host Configuration Protocol (DHCP);

measuring current usage values of the network participant's data traffic in real time, the current usage values selected from the group consisting of the size of data transferred, the quantity of data bursts, the quantity of IP address destinations, the type of network protocol being used, and the length of an encryption key;

comparing the current usage values against the usage values within the statistical digital dossier of the network participant; and responsive to the current usage values deviating from the usage values within the statistical digital dossier beyond a predefined tolerance, issuing an alert signal.

13. The non-transitory computer-readable medium of claim 12, wherein the step of comparing the current usage values against the statistical digital dossier uses time series similarity measures.

14. The non-transitory computer-readable medium of claim 13, wherein the time series similarity measures are selected from the group consisting of Pearson's correlation, Goodman and Kruskal's gamma, and distance correlation.

15. The non-transitory computer-readable medium of claim 12, wherein the network participant is a device, a device and application, or a group of devices and applications under a common group identifier.

16. The non-transitory computer-readable medium of claim 15, wherein the network participant is identified by the device Media Access Control (MAC) address, subscriber identifier, user name, International Mobile Subscriber Identity (IMSI), or Mobile Station International Subscriber Directory Number (MSISDN).

17. The non-transitory computer-readable medium of claim 12, wherein the plurality of networks is selected from the group consisting of wired and wireless networks, including Code Division Multiple Access (CDMA), General Packet Radio Service (GPRS), Universal Mobile Telecommunications System (UMTS), Long-Term Evolution (LTE), 5G, Low Power Wide Area Networks (LPWAN), Wi-Fi, Broadband Internet, Asymmetric digital subscriber line (ADSL), and a combination thereof.

18. The non-transitory computer-readable medium of claim 12, wherein the statistical digital dossier is created using data available in every frame of data transmitted to and from the network participant.

19. The non-transitory computer-readable medium of claim 12, wherein the data traffic is captured using a mirroring or reporting function of an existing network device, or via adding a network capturing device into the plurality of networks.

20. The non-transitory computer-readable medium of claim 12, further comprising updating the statistical digital dossier based on the current usage values if the current usage values are within the predefined tolerance.

* * * * *